United States Patent
Walsh et al.

(10) Patent No.: US 8,527,582 B2
(45) Date of Patent: Sep. 3, 2013

(54) SYSTEMS AND METHODS FOR REQUESTING AND DELIVERING NETWORK CONTENT

(75) Inventors: David Joseph Walsh, Fort Mill, SC (US); Michael Emil Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 164 days.

(21) Appl. No.: 12/987,542

(22) Filed: Jan. 10, 2011

(65) Prior Publication Data

US 2012/0179787 A1   Jul. 12, 2012

(51) Int. Cl.
*G06F 15/16* (2006.01)
(52) U.S. Cl.
USPC .......................................................... 709/203
(58) Field of Classification Search
USPC .......................................................... 709/219
See application file for complete search history.

(56) References Cited

U.S. PATENT DOCUMENTS

| | | | |
|---|---|---|---|
| 5,903,732 A | 5/1999 | Reed et al. | |
| 6,343,323 B1* | 1/2002 | Kalpio et al. | 709/229 |
| 7,587,499 B1* | 9/2009 | Haghpassand | 709/229 |
| 8,224,950 B2* | 7/2012 | Humes | 709/224 |
| 2002/0178381 A1* | 11/2002 | Lee et al. | 713/201 |
| 2003/0233329 A1* | 12/2003 | Laraki et al. | 705/52 |
| 2005/0198332 A1* | 9/2005 | Laertz et al. | 709/229 |
| 2006/0206589 A1* | 9/2006 | Lentini et al. | 709/219 |
| 2007/0100959 A1* | 5/2007 | Eichstaedt et al. | 709/217 |
| 2008/0066172 A1* | 3/2008 | Tarsi | 726/9 |
| 2008/0091796 A1* | 4/2008 | Story et al. | 709/217 |
| 2008/0183902 A1* | 7/2008 | Cooper et al. | 709/250 |
| 2010/0057830 A1* | 3/2010 | Takala | 709/203 |
| 2010/0250695 A1* | 9/2010 | Shenfield et al. | 709/206 |

* cited by examiner

*Primary Examiner* — Hadi Armouche
*Assistant Examiner* — Christopher C Harris
(74) *Attorney, Agent, or Firm* — Banner & Witcoff, Ltd.; Michael A. Springs

(57) ABSTRACT

A system and method for facilitating content requests while maintaining content restrictions may include a proxy server configured to filter requested content based on specified content restrictions. The proxy server may initially retrieve the requested content from an external site using unrestricted access credentials. Upon receipt of the requested content, the proxy server may filter the content to remove and/or replace portions thereof that do not comply with content restrictions. In some arrangements, filtering parameters may be user and/or device-specific. Additionally or alternatively, the proxy server may subscribe to and/or use information streams or feeds to deliver content from requested sites to a user. By delivering information streams or feeds, the potential for user transmission of data to external sites may be reduced and/or eliminated.

15 Claims, 7 Drawing Sheets

```
<html>
<head>
<title>Example Web-page</title>                                    400
</head><body bgcolor="yellow">
This is an example web-page that may be requested by a user.
<marquee>It's the best website in the world!</marquee>
<img src="http://www.example-image.com/images/sample.gif" alt =
"SAMPLE IMAGE OF GOVERNMENT BODY"></img>
<FORM ACTION="../cgi-bin/mycgi.pl">
name: <INPUT NAME=realname><BR>
email: <INPUT NAME=email><BR>                                407
<INPUT TYPE=SUBMIT>
</FORM>
You can also follow this sample link: <a href="http://example.ex/
examplepage.html">Example Link</a>
</body>
</html>
```

405 → This is an example web-page...
403 → <marquee> line
409 → <img> line
401 → FORM block
407 → </FORM>

FIG. 4A

```
<html>                                                              450
<head>
<title>Example Web-page</title>
</head><body bgcolor="yellow">
This is an example web-page that may be requested by a user.
<marquee>It's the ****** in the world!</marquee>
<!-- <img src="http://www.example-image.com/images/sample.gif"></img>
--> IMAGE REMOVED <!-- <FORM ACTION="../cgi-bin/mycgi.pl">
name: <INPUT NAME=realname><BR>
email: <INPUT NAME=email><BR>
<INPUT TYPE=SUBMIT>                        453
</FORM> -->
You can also follow this sample link: <a href="http://proxy.server.address/
http://example.ex/examplepage.html">Example Link</a>
</body>
</html>
```

```
<html>                                                            460
<head>
<title>Example Web-page</title>
</head><body bgcolor="yellow">
This is an example web-page that may be requested by a user.
<marquee>It's the ****** in the world!</marquee>
<FORM>
name: <INPUT NAME=realname><BR>
email: <INPUT NAME=email><BR>
<INPUT TYPE=SUBMIT>                      463
</FORM>
You can also follow this sample link: <a href="http://proxy.server.address/
orig/XYZABC">Example Link</a>

</body>
</html>
```
461 points to `<INPUT TYPE=SUBMIT>` area.

FIG. 4C

```
<html>                                                            470
<head>
<title>Example Web-page</title>
</head><body bgcolor="yellow">
This is an example web-page that may be requested by a user.
<marquee>It's the ****** in the world!</marquee>
 <FORM ACTION="../cgi-bin/mycgi.pl">
name: <INPUT NAME=realname disabled><BR>
email: <INPUT NAME=email disabled><BR>
<INPUT TYPE=SUBMIT disabled>          471
</FORM>
You can also follow this sample link: <a href="http://proxy.server.address/
http://example.ex/examplepage.html">Example Link</a>

</body>
</html>
```

FIG. 4D

SYSTEMS AND METHODS FOR REQUESTING AND DELIVERING NETWORK CONTENT

BACKGROUND

For many organizations, external network access represents a risk to security, productivity, privacy and data integrity. Accordingly, organizations will often implement content restrictions that prevent users within the organization from obtaining data from or transmitting information to external network sites such as web pages and web sites. However, these restrictions are often enforced by preventing all content, regardless of whether the content or portions thereof offend current organizational policies, from external sites. Thus, users requesting legitimate and authorized content or portions of content may be denied due to the general blocks on external network access or access to certain sites and pages.

SUMMARY

Aspects of the disclosure relate to systems and methods for enabling users to retrieve content from external sites while enforcing organizational content restrictions. In one or more arrangements, content restrictions may be enforced by a first proxy server or general gateway configured to process data entering into or exiting from an organizational network (e.g., a private network, a local area network, and the like). The first proxy server may determine whether external access is allowed based on user or device credentials. The first proxy server may be supplemented by a second proxy server configured to allow retrieval of content from external network sites without restrictions. The second proxy server may facilitate content requests from external sites while filtering the requested content in accordance with content restrictions instituted by the organization. Accordingly, inappropriate or offending types or portions of content may be filtered from, for example, a requested web page before delivery to the requesting user. This allows the requesting user to receive at least some of the requested content while maintaining the organization restrictions placed on external network access. Alternatively, the first and second proxy servers may be combined into a single system or server configured to perform the above-described functionalities.

According to another aspect, a proxy server may remove or replace offending elements of a content item such as a web page before delivering the content to a requesting user. In one example, offending types of video content may be removed and/or replaced with an indication that content was removed at that location in the content. In another example, comment submission forms or other types of interactive elements allowing users to transmit data outside of the organization network may be removed and/or replaced.

According to yet another aspect, links in a webpage may be rewritten or replaced with links that invoke a particular proxy server configured to provide filtered access to external networks. For example, a web page that is initially returned to the user may include links to other sites. However, by selecting those links, the user may be directed through a general organizational gateway or proxy server that restricts external access based on user credentials. Accordingly, the user might not be able to view any content from those links if the user does not have sufficient access privileges. By rewriting or replacing those links to specifically invoke a proxy server configured to allow filtered access, the user may be permitted to retrieve content, such as a web page, in a filtered manner (rather than being completely blocked from a web page or other content item).

According to yet another aspect, a proxy server may perform content filtering based on individual user access privileges. For example, the proxy server may filter out a type of content for a first user, but not a second user if the second user has access privileges for receiving the type of content. Accordingly, the proxy server may consult a privilege database to determine the types of filtering required for a particular requesting user or device.

According to still another aspect, a proxy server may subscribe to information feeds or streams that do not include an ability or option to submit information to external sites or systems. In one example, a proxy server may subscribe a user to a RSS (Really Simple Syndication) feed to provide information and content published by a requested site or content provider. The information feeds may still be subject to filtering (e.g., for objectionable content). In other arrangements, the information feeds might not be subject to filtering.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the claimed subject matter, as well as the following detailed description of illustrative embodiments, is better understood when read in conjunction with the accompanying drawings, which are included by way of example, and not by way of limitation with regard to the claimed subject matter.

FIGS. 4A-4D illustrate example content source code in pre-filtering and post-filtering states, respectively, according to one or more aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
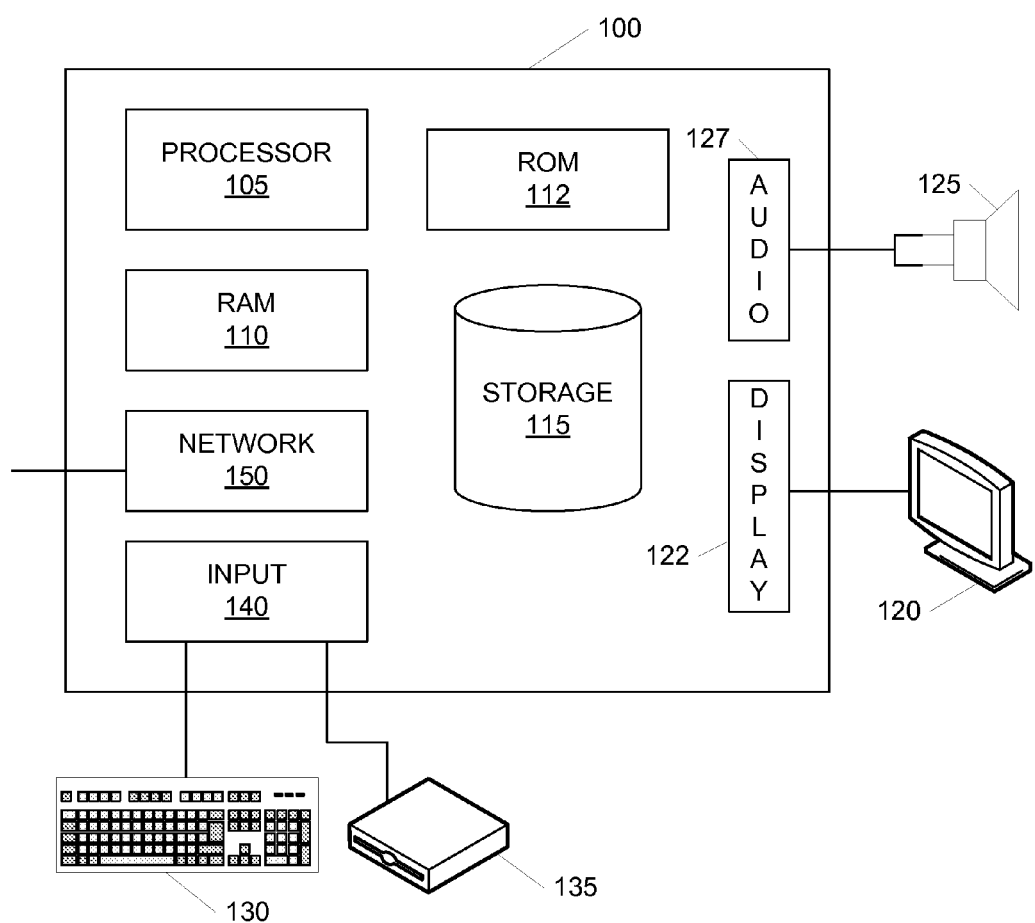
FIG. 1 illustrates a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable media such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In another example, credit card input may be received through a card reader (not shown) and converted into a digital format. In one or more instances, a device such as media drive 135 may act as both an input and output device allowing users to both write and read data to and from the storage media (e.g., DVD-R, CD-RW, and the like).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
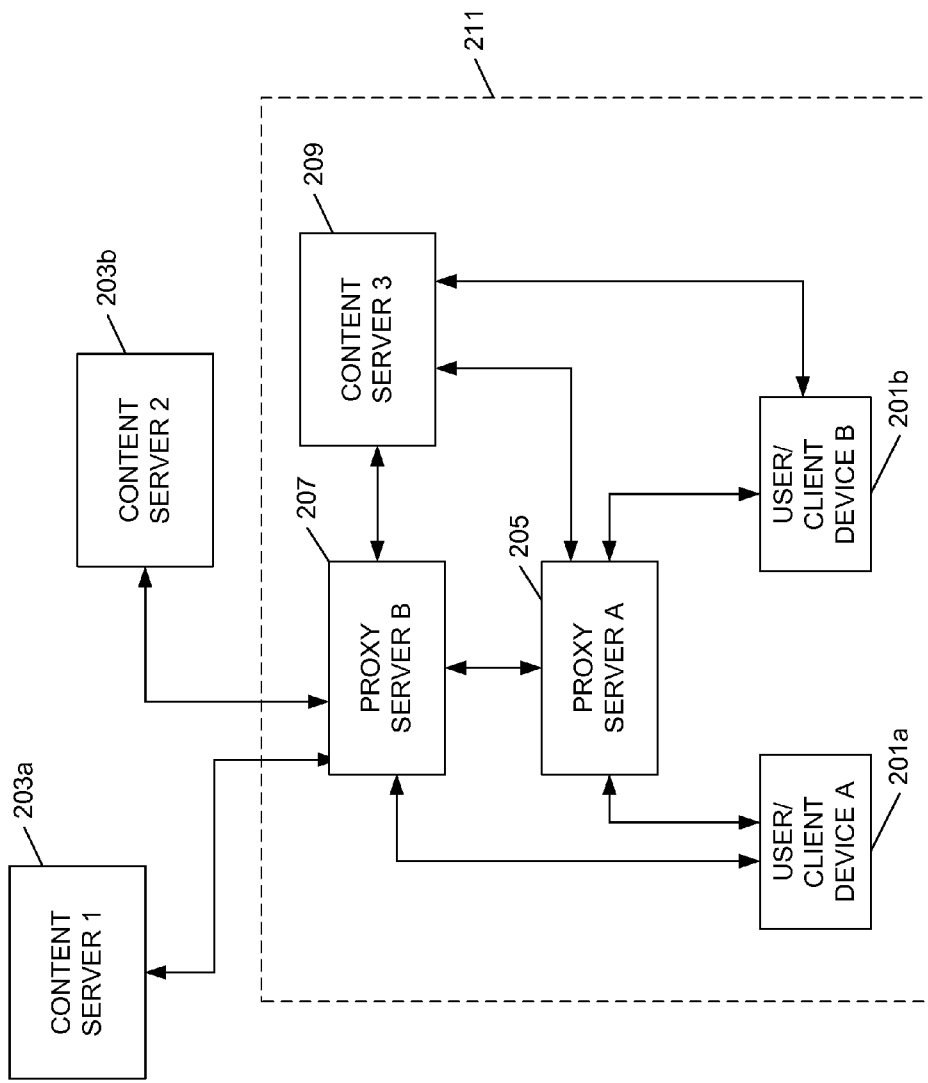
FIG. 2 illustrates an example network environment through which users may request content from various content providers according to one or more aspects described herein.

FIG. 2 illustrates a network environment in which users of computing devices 201a and 201b may request network content from one or more content providers 203a and 203b. In the illustrated embodiment, user or client computing devices 201a and 201b are associated with an organization or business through which network access is maintained. For example, computing devices 201a and 201b may all subscribe to the same network service provider, access a wide area network through the same gateway (e.g., a gateway of a business, organization, physical location, building, and the like), belong to the same organization or business and the like. In such an environment, the organization or business may control access to network content by each of the computing devices 201a and 201b and corresponding users (e.g., employees or members of a business or organization). Accordingly, if a user wishes to receive or distribute content outside of a local area network or a private network of the organization or business, the user may be required to obtain permission from the organization or business controlling network access. In one example, a business may prohibit users from posting messages or sending out communications through a particular channel such as the Web. Accordingly, users' access to particular sites may be filtered so that sites including interactive elements that allow a user to post messages or transmit information out of the organization are blocked.

The network environment includes a proxy server 205 configured to facilitate communications requests from and content delivery to each of computing devices 201a and 201b. Proxy server 205 serves as a filter and gateway to insure ensure that unauthorized material is not being requested or received by devices or users under its control or employment. Thus, when computing device 201a requests a webpage from a content provider such as content provider 203a or 203b, proxy server 205 evaluates whether the site from which the webpage is to be retrieved is an authorized site, whether the content being requested is appropriate (e.g., no pornography, no social networking sites, and the like) and/or whether the user is allowed to access such content. For example, different users may be granted different levels of network access such that a first user may have unfettered access to the web while another user may only view a selected subset of websites. Restrictions on access may also be time-based, size-based (e.g., content requested is too large), media-type based (e.g., no video, but audio is OK) and the like. Proxy server 205 may further be configured to re-write or otherwise modify websites, web pages or other types of network content to remove potential offending content (e.g., removal of links, removal of buttons or forms, and the like). By removing potential offending content or functions that enable a user to perform an unauthorized action, users may be granted access to all sites, with the caveat that the requested content may be filtered and/or otherwise modified prior to receipt.

In one or more alternate arrangements, the network environment may include multiple proxy servers 205 and 207. Each proxy server 205 and 207 may be configured to manage one or more processes of network content request and delivery. For example, proxy server B 207 may be configured to grant or deny access to certain sites or types of content based on the identity of the requesting user or computing device.

Proxy server B 207 may, in some arrangements, be configured as a primary gateway or proxy that receives all content requests (and/or incoming data) intended for external servers and systems (e.g., outside of an organization, private network or local area network). Another proxy server (e.g., proxy server A 205), on the other hand, may facilitate the bypassing of the rules instituted by proxy server B 207 when the users agree to content modification/filtering. Using proxy server B 207 alone, the user would not be allowed to access any site or content for which they are not authorized. However, with the use of proxy server A 205, the user may be allowed access to those sites or content if they consent to allowing the requested sites and content to be filtered and/or modified to remove potentially offending content. A user may provide consent for content filtering/modification through use of a specific website or network address that specifically invokes the use of proxy server A 205. In one example, to bypass the traditional user based filters of the proxy server B 207, proxy server B 207 may mask the user's identity using credentials that would allow and provide unfettered network access when passed to and/or requested from proxy server A 205. One type of masking may include using an unrestricted-access username, device name or other identifier rather than the actual requesting user or device's identifier. Such an unrestricted-access identifier may be predefined by a network administrator, for instance. Upon receipt of the requested content (e.g., when returned by proxy server B 207), proxy server 205 may then scrub or otherwise modify the content based on predefined rules. In some arrangements, the functionalities of proxy servers 205 and 207 as described above may be combined into a single server, device or system.

In some instances, content may be retrieved from content servers internal to an organization (e.g., as illustrated by dashed line 211) such as content server 209. Retrieval of content and other information and/or dates from internal content servers might not require processing, filtering and/or evaluation by proxy servers 205 and 207. Alternatively, retrieval of content from internal content servers might still be processed through one or more of servers 205 and 207; however, in some arrangements, content restrictions might not apply to content requests directed to internal content servers.

Figure 3:
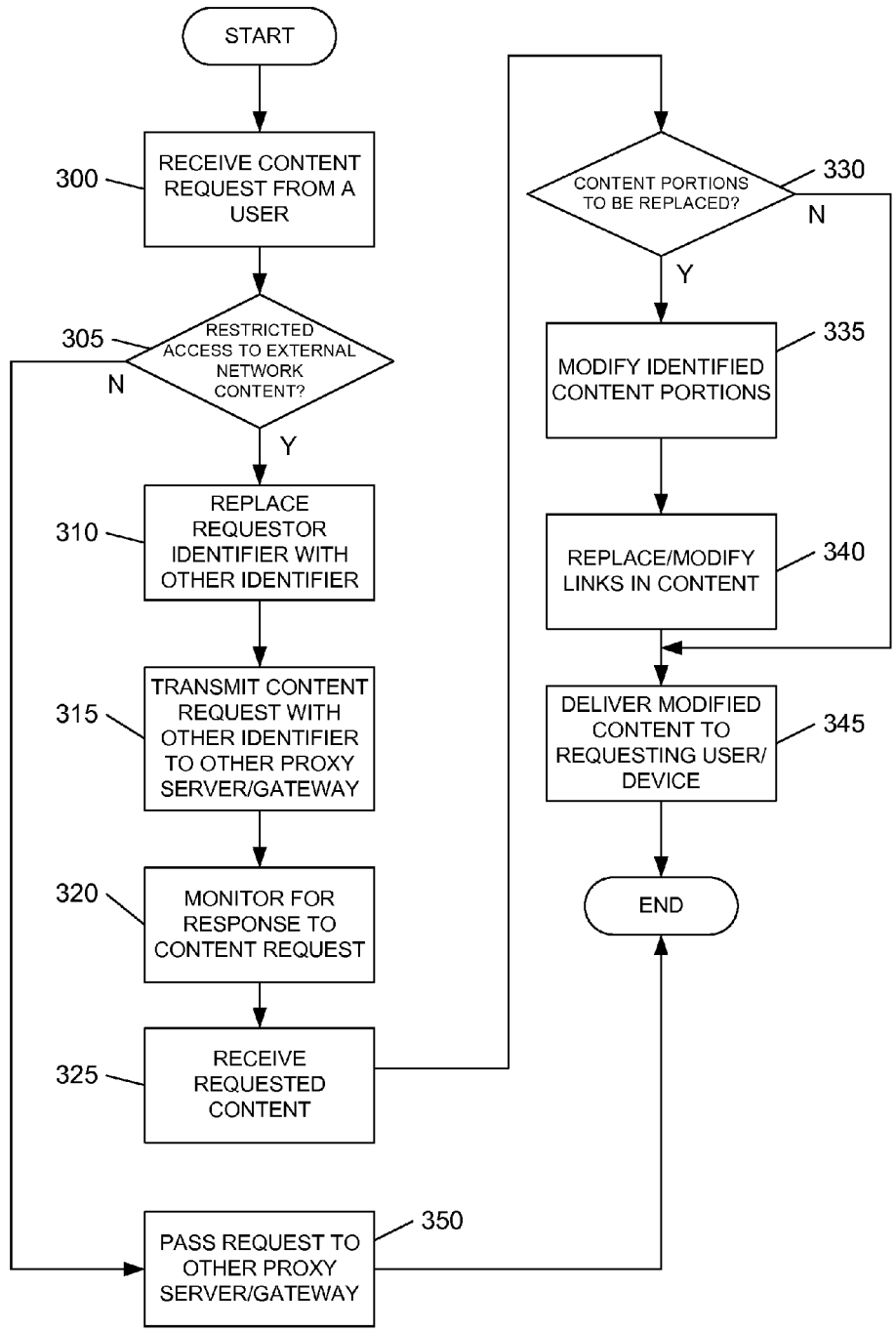
FIG. 3 is a flowchart illustrating an example method for retrieving and filtering content according to one or more aspects described herein.

FIG. 3 illustrates an example process through which a user requests content using one or more proxy servers such as server 205 (FIG. 2) to filter and modify content in accordance with predefined rules. In step 300, for example, a proxy server may initially receive a content request from a user through a user operated device such as a workstation or other computing system, a mobile device and the like. The content request may be received through a local area network of an organization such as a company in one or more arrangements. In other examples, the content request may be received through a wide area network such as the Internet. According to some arrangements, the user may be required to specifically address the request to the proxy server rather than through another primary gateway/proxy that must evaluate all requests before being passed to a content provider. In step 305, the proxy server may determine whether the user has restricted or unrestricted access to external network content. In one or more arrangements, a level of restricted access (or unrestricted access) may depend on the type of content requested, a source of the content, a requesting device and the like. If the user's external content access is not restricted, the request may be passed to the gateway or other proxy server (e.g., proxy server 207 of FIG. 2) in step 350 without modification or further processing by the present filtering proxy server (e.g., proxy server 205 of FIG. 2). However, if the proxy server determines that the user's access to the requested content is restricted (e.g., not permitted to receive the content), the proxy server may modify the request to replace a user and/or device identifier associated with the content request with another identifier in step 310. The replacement identifier is used to achieve unfettered or unrestricted access to the requested content and/or to the external network in general. For example, the replacement identifier might not be associated with any network or content access restrictions. Alternatively or additionally, the replacement identifier might not be associated with network or content access restrictions specific to the content source from which the requested content is to be retrieved.

In step 315, the content request with the replacement identifier may be transmitted to a gateway or another proxy server configured to generally control external network access by internal computing systems and users. In one or more arrangements, the content request with the replacement/modified identifier might not include any identification of the actual requesting user or device. Alternatively, the content request may also include identification of the requesting user or device. The proxy server may further store the content request to be able to later identify the requesting device and/or user when a response to the request is received. Once the content request has been passed to the gateway or other proxy server with the replacement identifier, the proxy server may begin monitoring for a response in step 320.

In step 325, the proxy server may receive the requested content from the other proxy server or a gateway. Alternatively, the proxy server may receive a response indicating that the content or content server was not available or that the address was invalid. A variety of responses may be received in response to a network content request. Upon receipt of the requested content, the proxy server may determine whether to replace one or more portions or elements of the requested content in step 330. The proxy server may determine whether one or more portions of the requested content are to be replaced based on predefined content allowability rules (e.g., organizational content restrictions). Such rules may be defined by an organization, by a default setting, by a user, by a parent or guardian and the like. Rules may be time-dependent; for example, a first set of content restrictions may apply during business hours (e.g., between 6 AM and 6 PM) while a second (different) set of content restrictions may apply during non-business hours (e.g., between 6:01 PM and 5:59 AM). Rules may also be content type or content source dependent. Thus, some types of content such as video may be allowed while audio might not. In another example, users or devices may be allowed to retrieve content from a first website, but not content from a second website. Additionally or alternatively, content restriction rules may be different for different users, departments within an organization, devices, pay levels, job titles and the like. A variety of content restrictions may be defined depending on user and/or organization needs, restrictions and preferences. The proxy server may thus compare the content allowability rules to the requested content to identify whether portions of the requested content are to be modified (e.g., replaced). For example, if the requested content includes video, and the content allowability rules disallow video, then the proxy server may determine that the video portions of the content are to be replaced. In another example, if the content allowability rules disallow forms or other user entry elements, the proxy server may determine that the requested content is to be modified if the content includes such interactive elements.

If the proxy server determines that one or more portions or elements of the requested content are to be replaced, the proxy server may modify the identified content portions or elements in step 335. Modification of the content portions may include replacement or removal. In one example, active hyperlinks may be removed and replaced with mere text corresponding to the address of those hyperlinks (e.g., non-active text elements conveying a website or webpage address). In another example, forms may be removed from webpages entirely. In yet another example, images, videos and/or audio may be removed if the images, videos or audio are deemed to be inappropriate using image analysis or based on image, video and/or audio tags that describe the corresponding content. Text may also be censored (e.g., removed or blocked out using *s or other symbols) if the text is deemed to violate the content allowability rules. Further details regarding replacement and removal of content elements are described below. As discussed, in some arrangements, content restrictions may be specific to a user, device, department, job title, pay grade or the like. Accordingly, modifications made to a content item may be different depending on the requesting user or device.

In step 340, the proxy server may further optionally replace remaining links in the requested content with links configured to initially direct content requests through the proxy server. Otherwise, content requests resulting from invocation of the links might not be processed as described above with respect to steps 300-315 by the proxy server and may be blocked or denied by the general network gateway or proxy server. For example, without initially addressing content requests to the proxy server, the proxy server will not have the opportunity to replace a requestor identifier in the content request with one that has unfettered access to the requested content. Accordingly, the content request may be rejected outright without such modification of credentials.

In step 345, the modified content may subsequently be delivered to the requesting device and user. The proxy server may identify the requesting device and user using the stored association between the content request and the requesting device and/or user. Using the above process, organization may prevent certain interactions and content requests with external networks while still allowing individuals associated with the organization to retrieve non-offending portions or non-offending versions of requested content. In one particular example, if an organization does not wish for internal users (e.g., employees) to disseminate or otherwise transmit information to external sites and systems, the organization may use the proxy server to remove all potential data transmission elements from requested content before delivering the content to the requesting user. Accordingly, the organization might not need to block external content requests entirely and/or entire content items to prevent such external data transmissions.

Replacement of content within a content item may also be performed to provide additional information (e.g., as opposed to removal of data). In one example, the proxy server may scan the content to identify any known individuals and replace any mention of the known individuals with internal links to biographies, contact information, pictures, related stories and the like. For example, if the name "XXX YYY" appeared in the text of a web page, the proxy server may determine that XXX YYY is an employee and retrieve and/or generate a link to XXX YYY's profile, biography, virtual business card, phone number, image, related information or the like. The link may then be included in the content by, in one example, making the user's name XXX YYY an active hyperlink. Other types of names (e.g., names of businesses, departments, and the like) and other references within the content item may be similarly enhanced to provide additional information and details.

FIGS. 4A-4D illustrate example source code segments for a web page before and after a proxy server has modified elements thereof. For example, FIG. 4A illustrates web page source code 400 that includes form element 401, image 403, text 405 and link 407. An organization that disallows data submission to external systems, images of a political nature and text soliciting donations may analyze the source code to identify offending elements 401, 403 and 405. In particular, because form element 401 allows a user to submit comments to external systems, form 401 may be deemed inappropriate. In the case of image 403, the explanatory tag line 409 may indicate that the image corresponds to a picture of a governmental body and accordingly, may also be deemed inappropriate. Finally, with respect to text 405, a text analysis engine may determine that text 405 includes portions requesting donations or other types of payments and thus, notify the proxy server that the portions of text 405 are offensive according to the predefined organization rules.

FIG. 4B illustrates modified web page source code 450 generated as a result of filtering out and replacing the identified offending elements 401, 403 and 405 of FIG. 4A. In source code 450, the form element (element 401 of FIG. 4A) and the inappropriate image (image 403 of FIG. 4A) have been removed. In some instances, interactive elements might be rendered inactive rather than being removed (e.g., by placing the corresponding page code in comment identifiers such as "<!--COMMENT-->" and the like). Additionally or alternatively, the deactivated or removed elements may be replaced with indicators (e.g., text, images, icons, audio, video, and the like) that notify a viewer that an element of the web page was removed, deactivated and/or replaced. For example, text 451 may be used to indicate that an image previously existed in a particular location of the web page. According to one or more aspects, offending text such as text 405 of FIG. 4A may be removed and replaced with symbols or images such as asterisks ("*") as shown in FIG. 4B. In another example, an image of a black bar may be inserted in the location of the offending text to indicate that text was censored or removed. In yet another example, the offending text, image, video or other page elements may be removed without replacement. Various other replacement, removal and/or deactivation methods may be used.

FIG. 4C illustrates another example modified source code based on the original source code illustrated in FIG. 4A. In FIG. 4C, source code 460 may deactivate a FORM element 461 rather than commenting out the FORM element. For example, the ACTION attribute in the FORM tag 461 has been removed. The ACTION attribute typically defines the interaction or process to be taken with the data entered into the fields of the FORM. In one arrangement, the ACTION attribute may refer to a script (e.g., PERL script). Accordingly, no actions will be taken even if a user enters data in the corresponding form fields when the ACTION attribute is removed.

Additionally, instead of displaying the link address in the payload of the proxy server redirect address 463, the original link address may be encrypted (e.g., as represented by "XYZ-ABC") using an encryption algorithm or otherwise encoded to hide the original address. This may prevent users from circumventing or attempting to circumvent the proxy server with knowledge of the original address. The proxy server may store the original unencrypted or unencoded address in its database and retrieve it upon receive a request with the encoded address in the payload.

In FIG. 4D, source code 470 illustrates another mechanism for deactivating a FORM or elements of the FORM. In particular, source code 470 illustrates the disabling of form fields such that users are not able to interact with or use the fields. For example, if the field is a text entry box, the field may disallow users from entering input into or selecting the field. In the illustrated example, source code 470 includes disabled attributes 471 within each INPUT field tag. Additionally, the INPUT type tag may also include a disabled attribute 471.

By allowing a form to remain in some form (e.g., with elements or the entire form element disabled or deactivated), the format of the page may remain as originally provided. In some arrangements, removing a form entirely may adversely affect the format of a web page, resulting in difficulties in reading or interpreting the information included in the page.

In some cases where some or all links are allowed to remain on the page, the proxy server may re-write or replace the links with links that will initially direct the content request (generated from selection of a link) to the proxy server. FIG. 4B illustrates re-written or replacement link 453 that illustrates how link 407 of FIG. 4A may be rewritten to specifically invoke the proxy server. For example, link 453 may be directed to a network address of the proxy server with the link address in a payload portion of the HTTP REQUEST.

Figure 5:
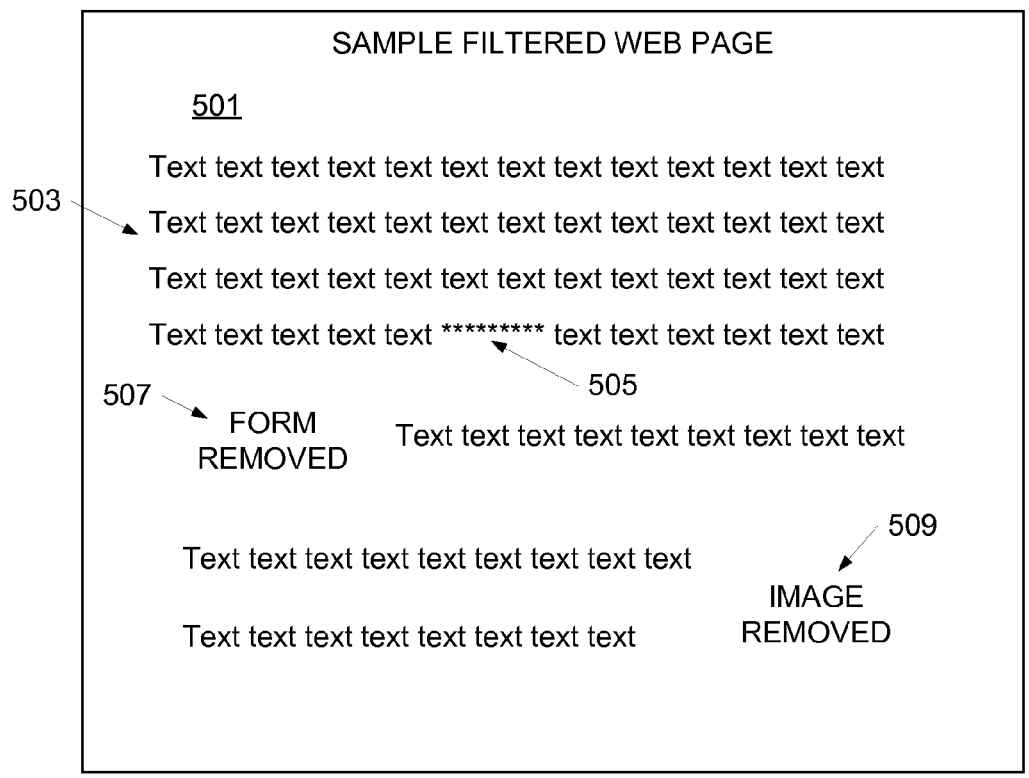
FIG. 5 illustrates an example web page that may be outputted after filtering according to one or more aspects described herein.

FIG. 5 illustrates an example web page that may be outputted by a proxy server after the web page has been filtered to enforce one or more specified content restrictions. For example, web page 501 may display text 503 that includes words or phrases 505 that have been blocked or hidden due to content restrictions. Additionally, web page 501 may include indicators 507 and 509 that specify where various features or content elements previously existed (e.g., prior to filtering). For example, indicator 507 may specify that a form existed in the corresponding location of web page 501 while indicator 509 may specify that an image was removed from web page 501. Various other types of filtering indicators may be used and presented in web page 501. In one or more arrangements, hovering over or otherwise interacting with indicators 505, 507 and/or 509 may cause a filtering information window (not shown) to be displayed. The filtering information window may provide additional details relating to the filtered content such as a size of the filtered content, an identifier of a restriction causing the content to be filtered, a content type (e.g., image, text, video, audio, and the like) and the like. Alternatively, indicators (e.g., indicators 505, 507 or 509) might not be included since adding such indicators might affect the page layout.

An additional or alternative method and system for allowing users to access websites and web pages while still enforcing content/interaction restrictions imposed by an organization includes the use of new or information streams. For example, instead of or in addition to delivering the requested content in a filtered manner, the proxy server may also subscribe a user to an available news or information feed corresponding to the requested site or page. By delivering the news or information feed, the user is not provided with any interactive elements that would potentially allow the user to submit information to external sites or systems. In some arrangements, text, images and/or audio included in the information feeds may be filtered as discussed herein, if necessary.

Figure 6:
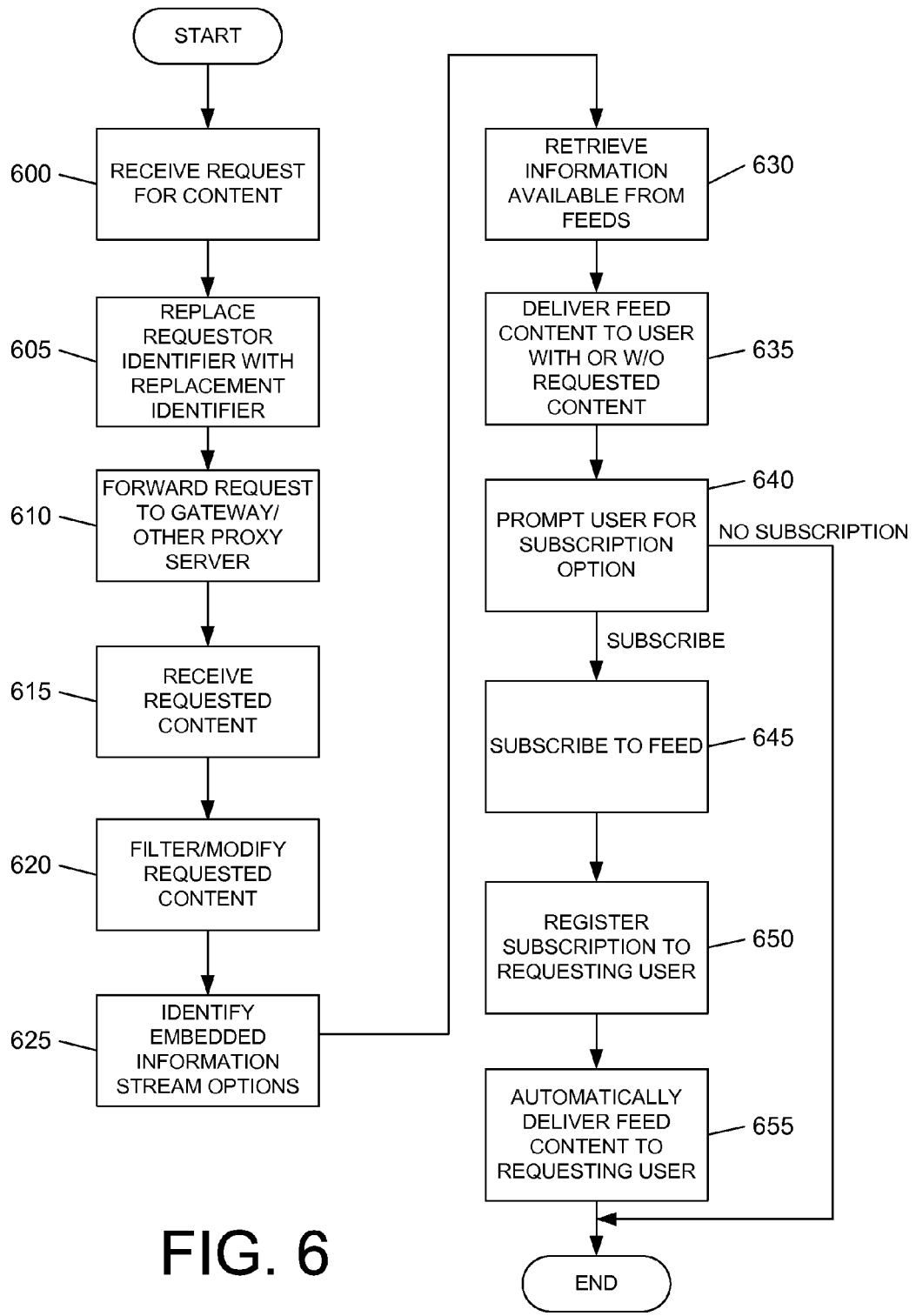
FIG. 6 is a flowchart illustrating an example method for retrieving and delivering requested content through information feed subscriptions according to one or more aspects described herein.

FIG. 6 illustrates an example method for subscribing users to an information stream in response to a content request. In step 600, a proxy server may receive a request for content from a network site external to a particular network (e.g., local area network, private network, and the like). As discussed herein, the proxy server may subsequently replace a requestor identifier specified in the request (or in association with the request) with a replacement identifier having unfettered access to external network sites in step 605. In step 610, the proxy server may forward the request with the replacement identifier to a gateway device or other proxy server for retrieving of the requested content from an external site. The gateway device or other proxy server may be configured to process all traffic that is outgoing to or incoming from external sites. The gateway device or proxy server may confirm that the requesting user or device is authorized to access the external site from which content is being requested.

In step 615, the proxy server may receive the requested content from the gateway or other proxy server. In step 620, the proxy server may filter and/or modify the requested content to remove or replace portions of the content that are disallowed under predefined content retrieval rules. Additionally, the proxy server may parse the requested content to identify embedded information stream options in step 625. In one example, the information stream option may correspond to an RSS feed option. Generally, information feeds or streams are unidirectional lines of communication that provide content about one or more topics. In some examples, these feeds are read-only and only provide information without options for response by the reader. Accordingly, information feeds may satisfy content restrictions against transmission of data to external sites (e.g., using interactive elements such as forms embedded in a web page).

If an information feed is identified, the proxy server may also retrieve the information available from the feeds in step 630. The proxy server may then deliver the RSS feed rather than or in addition to the filtered version of the requested content in step 635. In some instances, the proxy server may prompt the user to determine whether the content from the information feeds are desired. Additionally or alternatively, the proxy server may prompt the user to determine whether the information feeds may substitute or replace the requested content. If so, the proxy server might only deliver the content from the information feeds.

According to some configurations, the proxy server may also allow users to subscribe to information feeds. Content provided through the information feeds or streams may then be delivered to the user without the user having to proactively request content. In one example, the proxy server may prompt the user to determine whether a subscription is desired, as shown in step 640. If the user wishes to subscribe to the information feed, the proxy server may subsequently subscribe to the corresponding information feed using an RSS application in step 645. For example, the proxy server may subscribe to the RSS feed using its own credentials that provide unfettered or unrestricted access to external sites. Additionally, the proxy server may register the subscription with the requesting user or device in step 650. For example, the proxy server may store an association between the subscription and an identifier of the requesting user or device. Accordingly, whenever new content is available through the feed (as notified or indicated through the RSS application), the proxy server may automatically transmit the content to the user registered with that feed in step 655. In some arrangements, multiple users may be registered with a single feed. As such, if new content becomes available through the feed, the new content may be transmitted to all of the registered users. Alternatively, if the user does not wish to subscribe, the proxy server might not subscribe to the information feed and, instead, provide content on an on-demand basis.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like. The computer readable instructions may be executed by one or more processors (e.g., multi-core processor or multi-processor systems) to cause an apparatus such as a computing device to perform various tasks, functions and the like.

While illustrative systems and methods as described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:
   receiving, at a proxy server, a request for content available through a network, wherein the request includes a first requestor identifier corresponding to at least one of a requesting device and a requesting user;
   requesting, by the proxy server, the content using a second requestor identifier different from the first requestor identifier;
   receiving the requested content;
   identifying one or more information feeds available from the requested content;
   subscribing to the one or more information feeds using the second requestor identifier; and
   storing an association between the subscription to the one or more information feeds and the first requestor identifier.

2. The method of claim 1, further comprising:
   detecting new content available from the one or more information feeds;
   obtaining the new content;
   determining one or more requestor identifiers associated with the subscription; and
   transmitting the new content to a device associated with the determined one or more requestor identifiers.

3. The method of claim 1, wherein the requested content includes a web page and wherein the one or more information feeds includes a Really Simple Syndication (RSS) feed.

4. The method of claim 1, further comprising replacing the first requestor identifier in the content request with the second requestor identifier.

5. The method of claim 4, wherein the first requestor identifier corresponds to a restriction against the requested content and wherein the second requestor identifier is not restricted from the requested content.

6. A non-transitory machine readable medium storing instructions that, when executed, cause an apparatus operating as a proxy server to:
   receive a request for content available through a network, wherein the request includes a first requestor identifier corresponding to at least one of a requesting device and a requesting user;
   request the content using a second requestor identifier different from the first requestor identifier;
   receive the requested content;
   identify one or more information feeds available from the requested content;
   subscribe to the one or more information feeds using the second requestor identifier; and
   store an association between the subscription to the one or more information feeds and the first requestor identifier.

7. The non-transitory machine readable medium of claim 6, the instructions, when executed, further causing the apparatus to:
   detect new content available from the one or more information feeds;
   obtain the new content;
   determine one or more requestor identifiers associated with the subscription; and
   transmit the new content to a device associated with the determined one or more requestor identifiers.

8. The non-transitory machine readable medium of claim 6, wherein the requested content includes a web page and wherein the one or more information feeds includes a Really Simple Syndication (RSS) feed.

9. The non-transitory machine readable medium of claim 6, the instructions, when executed, further causing the apparatus to replace the first requestor identifier in the content request with the second requestor identifier.

10. The non-transitory machine readable medium of claim 9, wherein the first requestor identifier corresponds to a restriction against the requested content and wherein the second requestor identifier is not restricted from the requested content.

11. An apparatus comprising:
    a processor; and
    memory storing instructions that, when executed by the processor, cause the apparatus to:
    receive a request for content available through a network, wherein the request includes a first requestor identifier corresponding to at least one of a requesting device and a requesting user;
    request the content using a second requestor identifier different from the first requestor identifier;
    receive the requested content;
    identify one or more information feeds available from the requested content;
    subscribe to the one or more information feeds using the second requestor identifier; and
    store an association between the subscription to the one or more information feeds and the first requestor identifier.

12. The apparatus of claim 11, the instructions, when executed, further causing the apparatus to:
    detect new content available from the one or more information feeds;
    obtain the new content;
    determine one or more requestor identifiers associated with the subscription; and
    transmit the new content to a device associated with the determined one or more requestor identifiers.

13. The apparatus of claim 11, wherein the requested content includes a web page and wherein the one or more information feeds includes a Really Simple Syndication (RSS) feed.

14. The apparatus of claim 11, the instructions, when executed, further causing the apparatus to replace the first requestor identifier in the content request with the second requestor identifier.

15. The apparatus of claim 14, wherein the first requestor identifier corresponds to a restriction against the requested content and wherein the second requestor identifier is not restricted from the requested content.

* * * * *